United States Patent
Albertelli et al.

(10) Patent No.: US 7,236,643 B2
(45) Date of Patent: Jun. 26, 2007

(54) SYSTEM AND METHOD FOR FILTERING AND BINARIZATION OF IMAGES IN THE PRESENCE OF SPECULAR NOISE

(75) Inventors: Lawrence E. Albertelli, Owego, NY (US); David L. Ii, Owego, NY (US); Nina Kung, Owego, NY (US)

(73) Assignee: Lockheed Martin Corporation, Bethesda, MD (US)

(*) Notice: Subject to any disclaimer, the term of this patent is extended or adjusted under 35 U.S.C. 154(b) by 821 days.

(21) Appl. No.: 10/104,878

(22) Filed: Mar. 22, 2002

(65) Prior Publication Data

US 2003/0179934 A1    Sep. 25, 2003

(51) Int. Cl.
G06K 9/00 (2006.01)
G06K 9/34 (2006.01)
G06K 9/40 (2006.01)
H04N 1/40 (2006.01)
H04N 1/38 (2006.01)
H04N 5/00 (2006.01)
G09G 5/00 (2006.01)
G09G 5/02 (2006.01)

(52) U.S. Cl. .................. 382/270; 382/101; 382/169; 382/177; 382/260; 382/274; 358/447; 358/463; 358/466; 345/611; 345/618; 345/647; 345/694; 348/606; 348/607

(58) Field of Classification Search .......... 382/270, 382/100–101, 105, 168–176, 177–179, 190, 382/210, 254, 260, 261, 264, 274, 275, 282–283, 382/199; 358/447, 448, 453, 461, 463–466; 345/611, 617, 618, 647, 690–697; 348/606–628
See application file for complete search history.

(56) References Cited

U.S. PATENT DOCUMENTS

| | | | | |
|---|---|---|---|---|
| 3,680,041 A | * | 7/1972 | Smith, Jr. | 367/9 |
| 4,556,851 A | * | 12/1985 | Levine | 377/63 |
| 4,855,581 A | | 8/1989 | Mertel et al. | 235/462 |
| 4,965,842 A | * | 10/1990 | Crossley et al. | 382/144 |

(Continued)

FOREIGN PATENT DOCUMENTS

EP    1113392 A1 * 12/2000

OTHER PUBLICATIONS

Srinivasa et al., IEEE Publication, Mar. 1992, "Detection of edges from projections". (pp. 76-80).*

(Continued)

*Primary Examiner*—Shavesh M Mehta
*Assistant Examiner*—Manav Seth
(74) *Attorney, Agent, or Firm*—Burns & Levinson LLP; Jacob N. Erlich; Orlando Lopez

(57) ABSTRACT

In order to render information contained in images more detectable in the presence of noise, the present invention discloses a system and method to binarize the images in the presence of noise. The method of this invention comprises the steps of applying a dynamic range reducing filter to the digitized image values, obtaining a range reduced image; applying an edge detecting filter to the range reduced image, obtaining a filtered image; and then, adaptively binarizing the digitized image utilizing the corresponding filtered image to obtain an adaptive threshold.

12 Claims, 7 Drawing Sheets

U.S. PATENT DOCUMENTS

| | | | | |
|---|---|---|---|---|
| 5,119,132 | A | | 6/1992 | Butler .......................... 355/208 |
| 5,212,741 | A | * | 5/1993 | Barski et al. ................ 382/156 |
| 5,247,588 | A | * | 9/1993 | Komatsu ..................... 382/263 |
| 5,389,887 | A | | 2/1995 | Mizukoshi ................... 327/72 |
| 6,256,057 | B1 | | 7/2001 | Mathews et al. ........... 348/144 |

OTHER PUBLICATIONS

Trier et al., IEEE Publication, 1994, "Evaluation of binarization methods for utility map images". (pp. 1046-1050).*

Gonzales et al., Book Publication, 1993, "Digital Image processing". (pp. 92-93, 166-169).*

Songde et al., IEEE Publication, May 1997, "Adaptive edge detecting approach based on scale-space theory". (pp. 130-133).*

Liu et al., IEEE Publication, May 1997, "Document image binarization based on texture features". (pp. 540-544).*

Liu et al., IEEE Publication, 1993, "An object attribute thresholding algorithm for document iamge binarization". (pp. 278-281).*

Zhao et al., IEEE Publication, 1998, "Use of the Laplacian of Gaussian operator in prostate ultrasound image processing". (pp. 812-815).*

Fleck, IEEE Publication, 1994, "Practical edge finding with a robust estimator". (pp. 649-653).*

Hussain et al., IEEE Publication, 1994, "Segmentation-based nonlinear image smoothing". (pp. 507-511).*

Reza et al, "Non-linear smoothing of signals by applying fuzzy clustering to local points". (pp. 595-599).*

Chen et al., IEEE Publication, 2000, "Weight adaption and oscillatory correlation for image segmentation". (pp. 1106-1123).*

Reutter et al., IPMI 2001, "Nonlinear edge preserving smoothing and segmentation of 4D medical images via scale-space fingerprint analysis". (pp. 1-7).*

Reutter et al., IEEE 2000, "Computationally efficient nonlinear edge preserving smoothing of n-D medical images via scale-space finterprint analysis" (pp. 282-286).*

Dai M. et al. *Image segmentation by a dynamic thresholding using edge detection based on cascaded uniform filters*, Signal Processing, Elsevier Science Publishers, B.V., Amsterdam, NL., vol. 52, No. 1, Jul. 1, 1996, pp. 49-63.

Takahashi Y. et al. *Morphology Based Thresholding for Character Extraction*, IEICE Transactions on Information and Systems, Institute of Electronics Information and Comm. Eng. Tokyo, Japan, vol. E76-D, No. 10, Oct. 1, 1993, pp. 1208-1214.

Yanowitz S.D. et al. *A New Method for Image Segmentation*, Proceedings of the International Conference on Pattern Recognition, Rome, Nov. 14-17, 1988, Washington, IEEE Comp. Soc. Press, US, vol. 1, Conf. 9, Nov. 14, 1988, pp. 270-275.

Cheriet M. et al., *A Multi-resolution based approach for handwriting segmentation in gray-scale images*, Proceedings of the International Conference on Image Processing, Austin, Nov. 13-16, 1994, Los Alamitos, IEEE Com. Soc. Press, US, vol. 3, Conf. 1, Nov. 13, 1994, pp. 159-163.

V. Wu, R. Manmatha, Document Image Clean Up and Binarization, available at http://citeseer.nj.nec.com/43792.html.

Ø.D. Trier and T. Taxt, Evaluation of binarization methods for document images, available at http://citeseer.nj.nec.com/trier95evaluation.html, also a short version published in IEEE Transactions on Pattern Analysis and Machine Intelligence, 17, pp. 312-315, 1995.

J. S. Lim, *Two Dimensional Signal and Image Processing*, ISBN 0-13-935322-4, pp. 453-459 and pp. 476-494.

* cited by examiner

SYSTEM AND METHOD FOR FILTERING AND BINARIZATION OF IMAGES IN THE PRESENCE OF SPECULAR NOISE

BACKGROUND OF THE INVENTION

This invention relates generally to methods and system for filtering and binarizing images, and, more particularly to binarizing images in the presence of specular noise, where the information of interest in the image is contained in edges.

Edges contain a significant portion of the information in an image. In some images, such as images containing addresses (text) and bar codes typical of address labels in postal items and packages, edges contain almost all the information. Recovering that information in the presence of specular noise can be difficult. An example of an application where those conditions occur is the recovery of address and bar code information in mail pieces with high gloss wrappings. The specular reflection caused by the high gloss wrappings introduces noise in the image and renders the detection difficult. Typically, OCR systems are used to recover the information. Binarizing in OCR systems, as described by Wu and Manmatha (V. Wu, R. Manmatha, Document Image Clean Up and Binarization, available at http://citeseer.nj.nec.com/43792.html) is traditionally performed with a multi directional global threshold method. Under such a binarization method, the results obtained when the image is obscured by specular noise can be difficult to interpret.

Many difficulties are encountered in recovering the information from images in the presence of specular noise, such as the noise caused by transmission through high gloss wrappings, when global binarization methods are used.

Several adaptive binarization methods have been proposed (see, for example, Ø. D. Trier and T. Taxt, Evaluation of binarization methods for document images, available at http://citeseer.nj.nec.com/trier95evaluation.html, also a short version published in IEEE Transaction on Pattern Analysis and Machine Intelligence, 17, pp. 312–315, 1995). Such proposed adaptive binarization algorithms are in general complex, difficult to implement, and, therefore, have not seen widespread use.

SUMMARY OF THE INVENTION

In order to render information contained in images more recoverable in the presence of specular noise, the present invention discloses a system and method to binarize the image in the presence of specular noise. The method of this invention comprises the steps of applying a dynamic range reducing filter to the digitized image values, obtaining a range reduced image; applying an edge detecting filter to the range reduced image, obtaining a filtered image; and then, adaptively binarizing the digitized image utilizing the corresponding filtered image to obtain an adaptive threshold.

In one embodiment of this invention, the dynamic range reducing filter is a base ten logarithm of one plus the digitized image pixel value. In another embodiment of this invention, the edge detecting filter is a Marr-Hildreth filter times a constant.

The method of this invention can be implemented by a system comprising means for calculating the range reduced image, means for calculating the filtered image and means for determining the binarization. For example, a dedicated processor and supporting memory could be used to implement the method of this invention. In another embodiment, a digital signal processor or a general purpose processor and supporting memory could be used to implement the method of this invention. In still another embodiment, any of the previously described processor and memory systems could be used to implement the filtering operation and a dedicated binarization circuit could be used to implement the binarization operation.

For a better understanding of the present invention reference is made to the accompanying drawings and detailed description and its scope will be pointed out in the appended claims.

DETAILED DESCRIPTION OF THE PREFERRED EMBODIMENTS

A system and method for binarizing an image in the presence of specular noise, that renders information contained in images more detectable in the presence of noise, is disclosed.

Figure 1A:
FIG. 1A depicts an original image under the presence of noise.
Figure 1B:
FIG. 1B depicts the binarized image obtained using a global binarization algorithm.
Figure 2A:
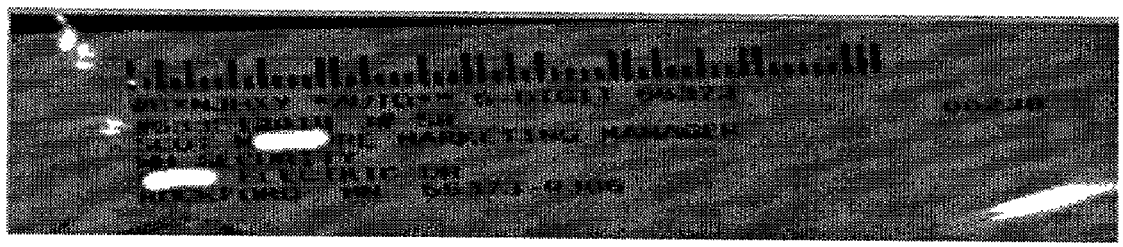
FIG. 2A depicts a second original image under the presence of noise.
Figure 2B:
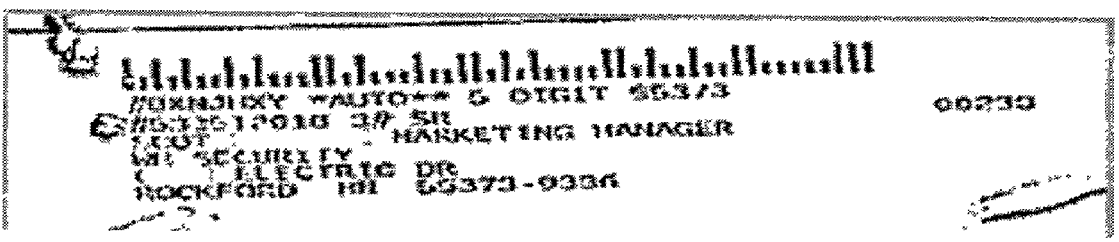
FIG. 2B depicts the binarized image, corresponding to the second image, using a global binarization algorithm.

In order to better understand the difficulties encountered in past attempts to apply global binarization methods as described above, reference is made to FIGS. 1A, 1B, 2A, and 2B of the drawings. More specifically, FIG. 1A depicts an original image under the presence of specular noise. FIG. 1B depicts the binarized image obtained from the image of FIG. 1A using a global binarization algorithm. Similarly, FIG. 2A depicts another original image under the presence of noise. FIG. 2B depicts the binarized image obtained from the image of FIG. 2A using a global binarization algorithm.

Figure 3:
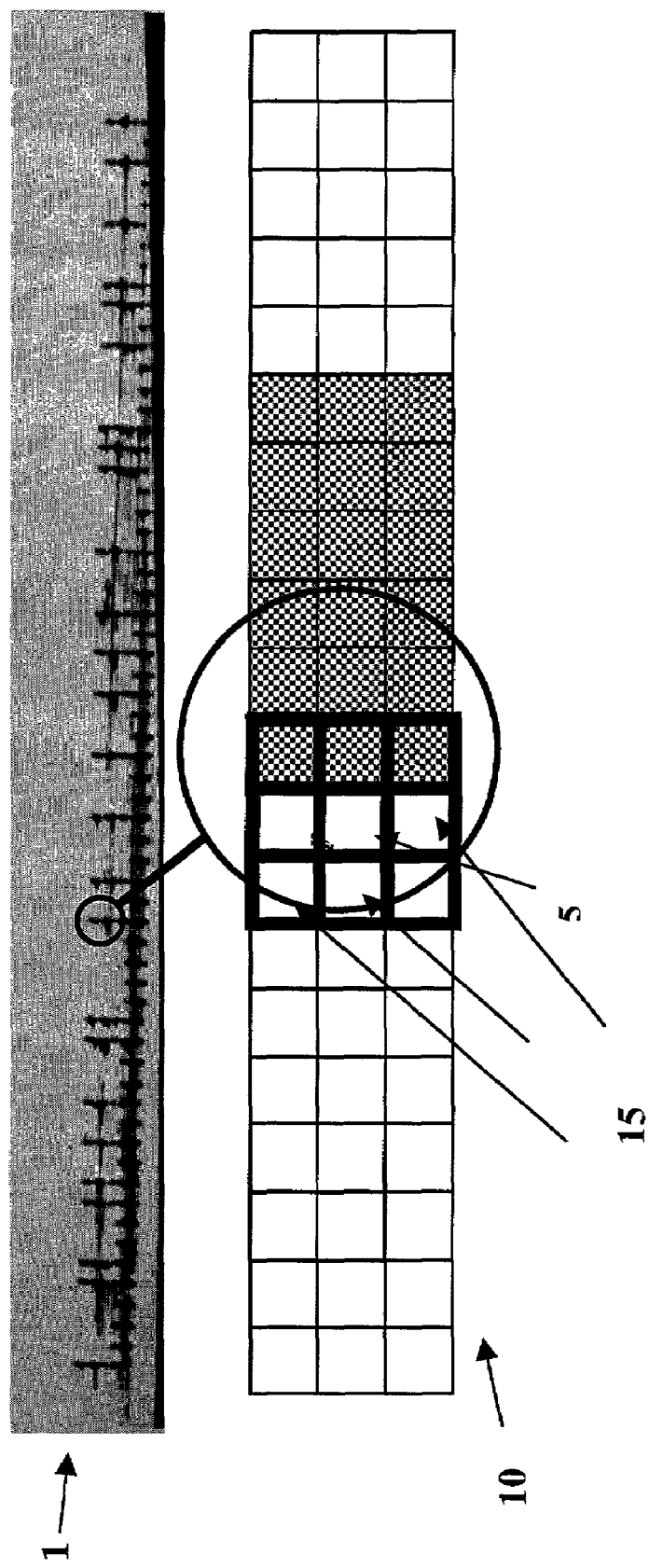
FIG. 3 is a graphical representation of the pixels from an image, depicting the locations at which a filter as used in an embodiment of this invention is applied.

A graphical representation of the pixels from an image 1 (where image 1 contains only bar codes), depicting the locations at which an embodiment of a filter as used in this invention is applied, is shown in FIG. 3. Referring to FIG. 3, for every point in the digitized image 10, there is a corresponding pixel value 5, $p_{i,j}$. Every pixel value 5, $p_{i,j}$, has a neighborhood of surrounding pixel values 15. Exceptions have to be made for the pixel values at the borders of the image. The methods for treating elements at the boundary are well known to those skilled in the art.

Figure 4:
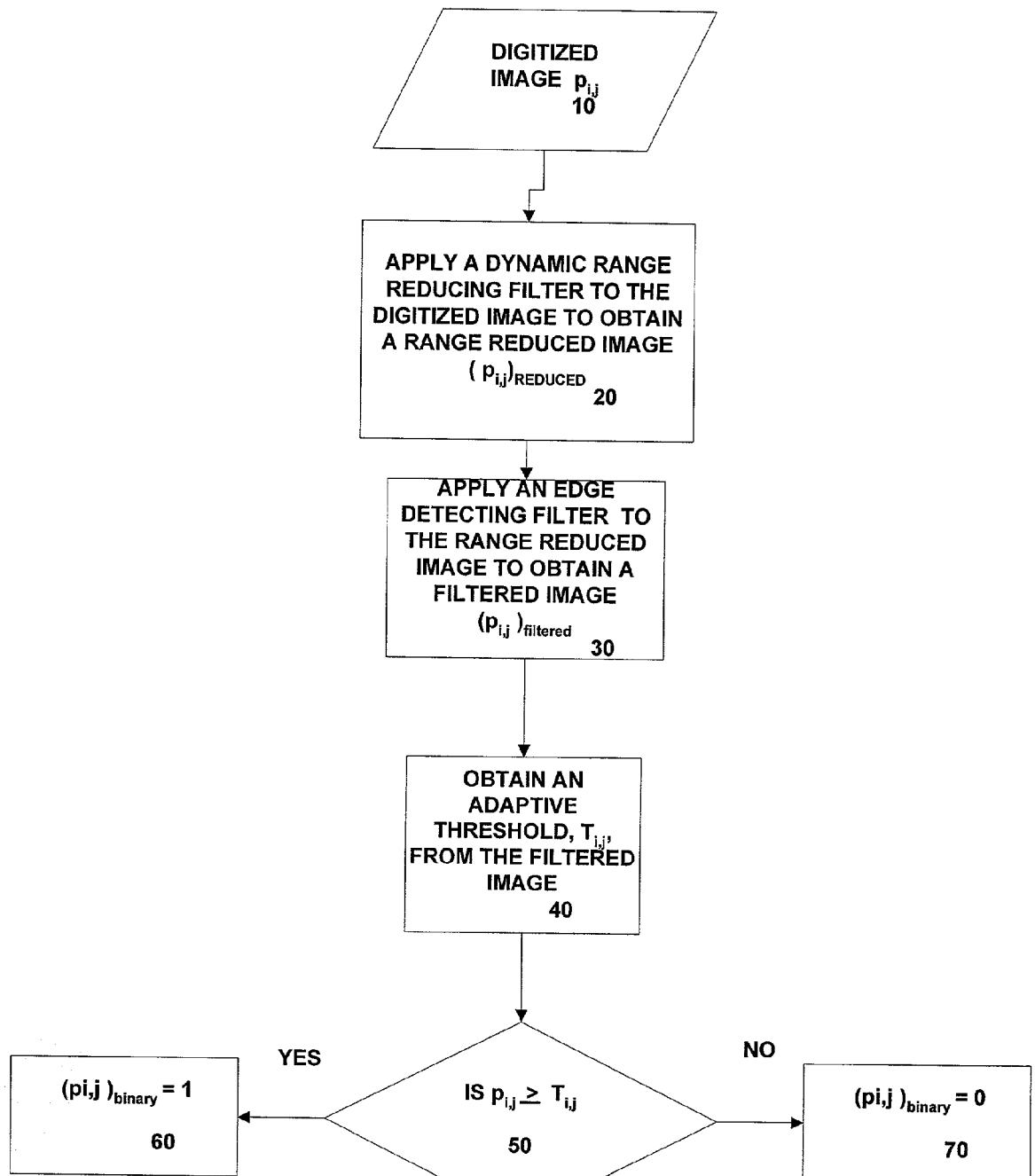
FIG. 4 is a flow chart representative of an embodiment of the method of this invention.

A flow chart representative of an embodiment of the method of this invention is shown in FIG. 4. Referring to FIG. 4, a dynamic range reducing filter or transformation is applied to each pixel value 5, $p_{i,j}$, (step 20, FIG. 4) obtaining a range reduced image with range reduced image pixel values, $(p_{i,j})_{reduced}$. If the dynamic range reducing filter or transformation is given by R(x), the range reduced image is given by $$(p_{i,j})_{reduced} = R(p_{i,j})$$

An edge detecting filter is applied to each pixel value of the range reduced image, $(p_{i,j})_{reduced}$, and to surrounding pixels of the range reduced image (step 30, FIG. 4). (Exemplary embodiments of dynamic range reducing filters and edge detecting filters are described in J. S. Lim, *Two Dimensional Signal and Image Processing*, ISBN 0-13-935322-4, pp. 453–59 and pp. 476–94, respectively.) A filtered image, $(p_{i,j})_{filtered}$, is obtained by applying the edge detecting filter to the range reduced image. If the edge detecting filter is given a by $h_{i,j}$, where the index j extends from −n to +n, and, similarly, the index i extends from −n to +n, the filtered image pixel values are given by $$(p_{i,j})_{filtered} = \sum_{k=-n}^{n} \sum_{l=-n}^{n} h_{k+n,l+n} (p_{i+k,j+l})_{reduced}$$

Using the filtered image pixel values, an adaptive threshold, $T_{i,j}$ is obtained (step 40, FIG. 4). The digitized image pixel value is then compared to the threshold, $T_{i,j}$ (step 50, FIG. 4). If the pixel value is greater than or equal to the threshold $T_{i,j}$, the binarized pixel value is set equal to 1 (step 60, FIG. 4). If the pixel value is less than the threshold, the binarized pixel value is set equal to zero (step 70, FIG. 4).

It should be apparent that other embodiments of the threshold comparison step could be used. The binarized pixel value could be set to 1 when the pixel value is greater than the threshold $T_{i,j}$, and to zero otherwise. Similarly, the binarized pixel value could be inverted (applying the logical NOT function) resulting in the logical opposite of the embodiment described above.

In a specific embodiment of this invention, the dynamic range reducing filter is a base ten logarithm of one plus the digitized image pixel value. In that embodiment, $$(p_{i,j})_{reduced} = \log_{10}(1 + p_{i,j})$$

In another specific embodiment, the edge detection filter used is a constant multiple of a Marr-Hildreth edge detector. A Marr-Hildreth edge detector is a filter generated by a Laplacian of a Gaussian and, for a 2n +1 by 2n +1 kernel, the filter, $h_{i,j}$, is given by $$h_{i,j} = \frac{e^{-((i-n)^2 + (j-n)^2)/2\pi\sigma^2}}{\pi\sigma^2} \left[ \frac{1}{\pi} \left( \frac{i-n}{\sigma} \right)^2 + \frac{1}{\pi} \left( \frac{j-n}{\sigma} \right)^2 - 2 \right]$$

In one embodiment, the filter used is sixty times a Marr-Hildreth filter with a σ of 1.5, and is given by $$h_{i,j} = 60 \frac{e^{-((i-n)^2 + (j-n)^2)/4.5\pi}}{\pi 2.25} \left[ \frac{1}{\pi} \left( \frac{i-n}{1.5} \right)^2 + \frac{1}{\pi} \left( \frac{j-n}{1.5} \right)^2 - 2 \right]$$

Figure 5:
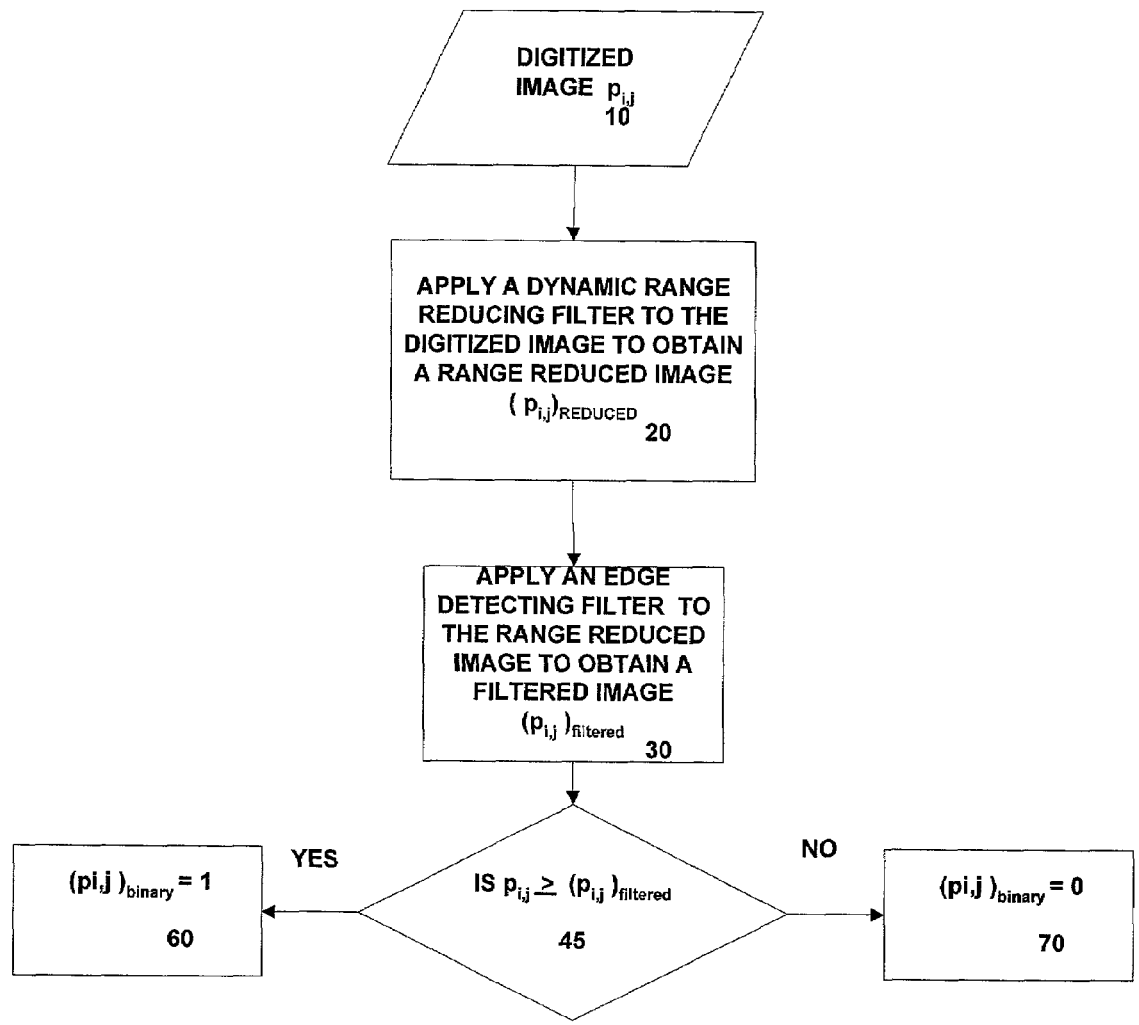
FIG. 5 is a flow chart representative of a detailed embodiment of the method of this invention.

A flow chart representative of a detailed embodiment of the method of this invention is shown in FIG. 5 wherein identical steps to those of FIG. 4 are represented by blocks with the same reference numbers. Referring to FIG. 5, the threshold is selected equal to the filtered image pixel value, $(p_{i,j})_{filtered}$ (step 45, FIG. 5).

Figure 6:
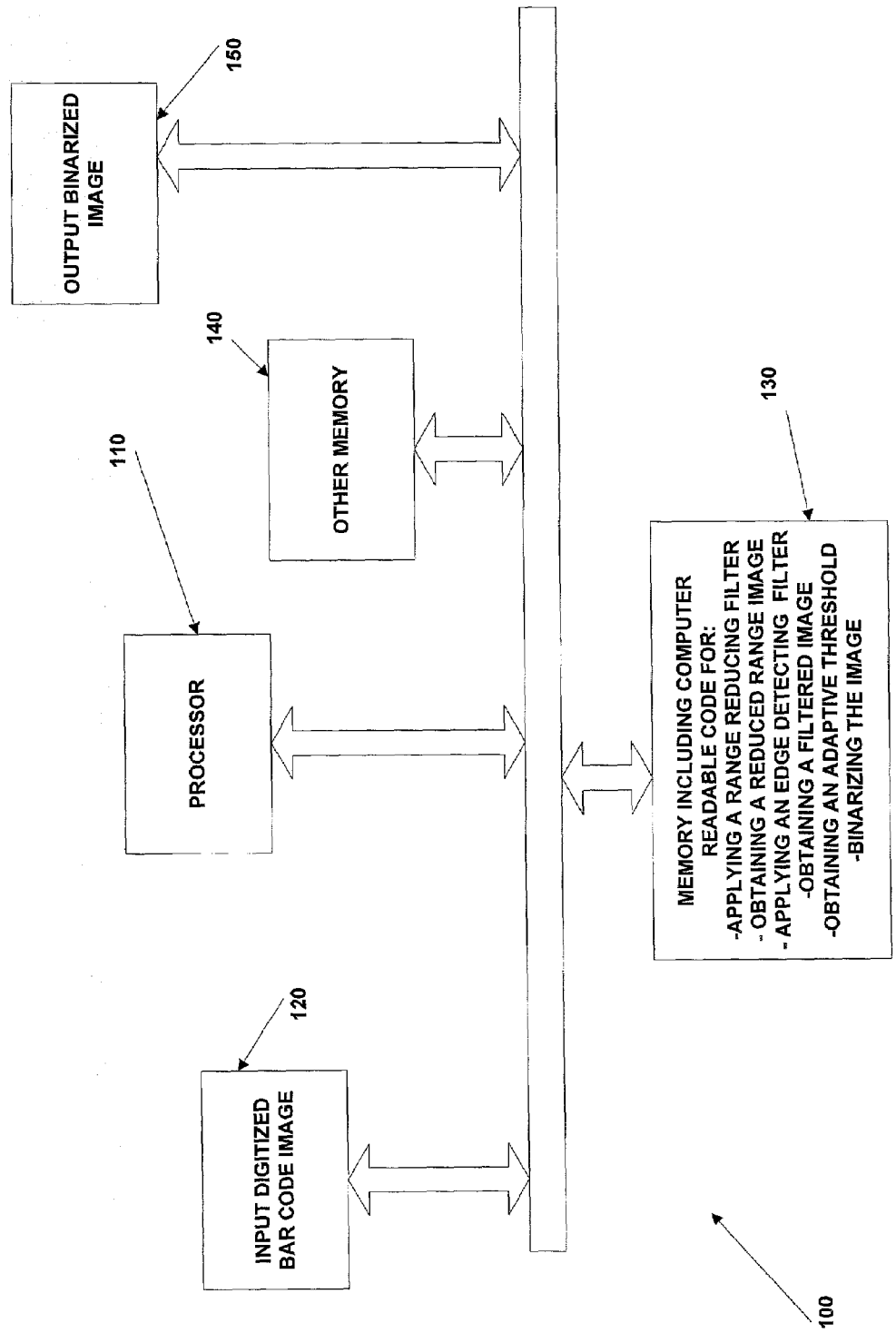
FIG. 6 is a block diagram representative of an embodiment of the system of this invention.
Figure 7:
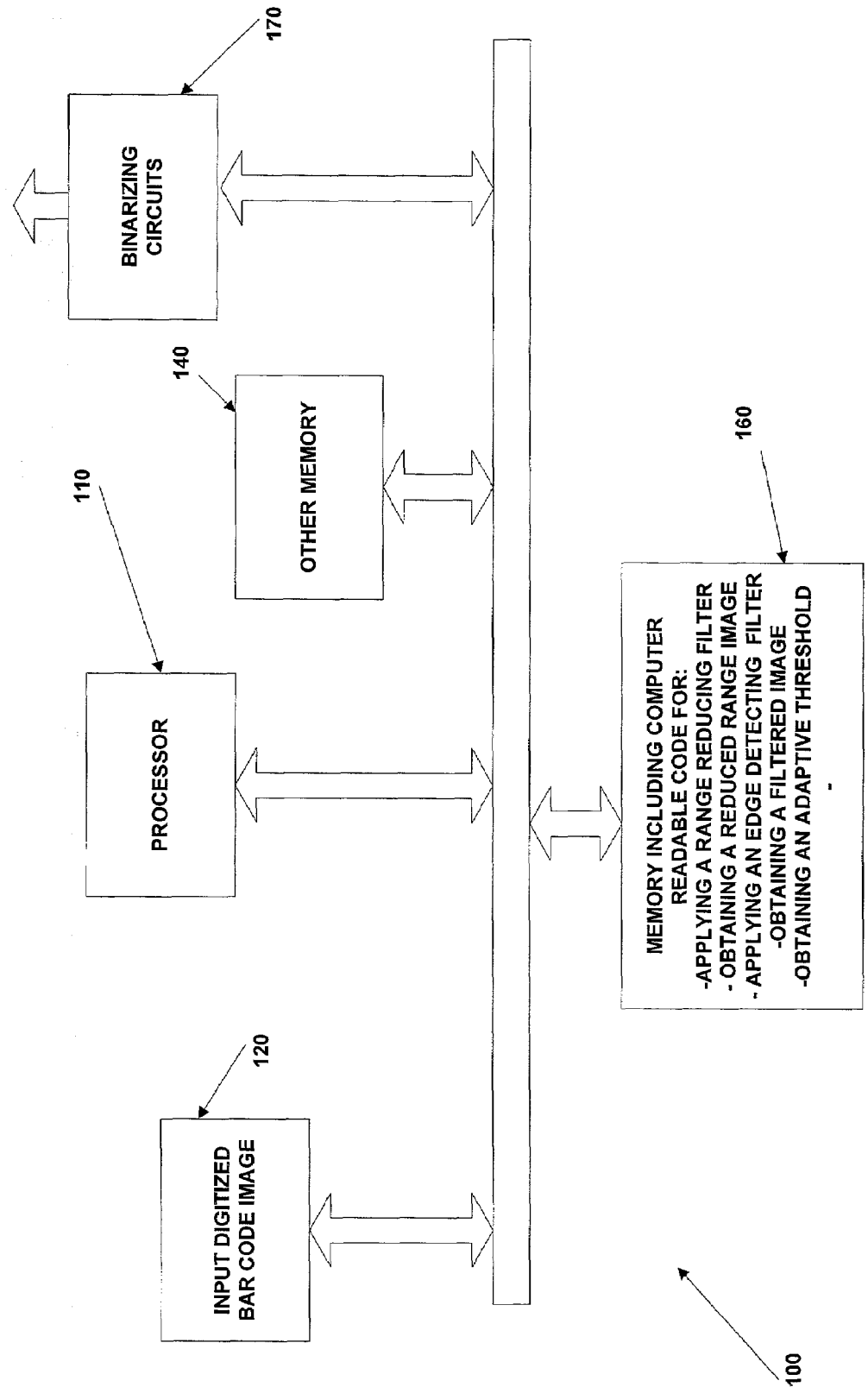
FIG. 7 is a block diagram representative of another embodiment of the system of this invention.

The method of this invention can be implemented by a system 100 (FIG. 6) comprising means for calculating the filtered image and means for determining the binarization. Referring to FIG. 6, a processor 110 and supporting memory 130 could be used to implement the method of this invention. Processor 110 can be a dedicated processor, or a digital signal processor, or a general purpose processor and supporting memory 130 could be any computer readable memory. The digitized image values are provided as input by input means 120. It should be apparent that input means 120 could be any input means known in the art. Other memory 140 could be used for housekeeping and other functions. The processor and memory systems and the code to cause the processor to implement the methods of this invention constitute means for applying a dynamic range reducing filter to the digitized image values, means for applying the edge detecting filter to the reduced range image and means for binarizing the digitized image. In another embodiment, shown in FIG. 7, wherein identical blocks as those shown in FIG. 6 are shown as blocks with the same block numbers, the previously described processor 110 and supporting memory 160 could be used to implement the filtering operations and the determining of the adaptive threshold and a dedicated binarization circuit 170 could be used to implement the binarization operation. For example, the operation of comparing the digitized image value to the filtered image pixel value at each pixel could be implemented by means of digital circuits.

Figure 1C:
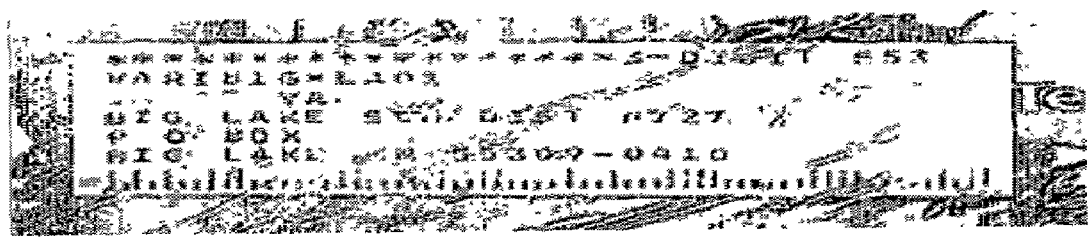
FIG. 1C depicts the binarized image obtained using an embodiment of a binarization algorithm of this invention.
Figure 2C:
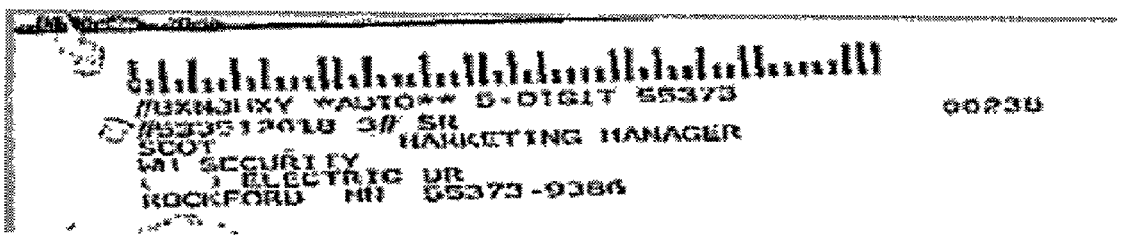
FIG. 2C depicts the binarized image, corresponding to the second image, obtained using an embodiment of a binarization algorithm of this invention.

The results obtained by applying the method of this invention to images in the presence of specular noise, such as the noise caused by viewing the image through a high gloss wrapping, can be seen from FIGS. 1A, 1C, 2A, 2C. FIG. 1A depicts an original image under the presence of noise. FIG. 1C depicts the binarized image obtained from the image of FIG. 1A using the method and system of this invention described above in which a range reducing filter equal to a base ten logarithm of one plus the digitized image pixel value and an edge detecting filter equal to sixty times a Marr-Hildreth (Laplacian of Gaussians) filter with a σ of 1.5 pixels are used. Similarly, FIG. 2A depicts another original image under the presence of noise. FIG. 2C depicts the binarized image obtained from the image of FIG. 2A using the method and system of this invention described above.

While the detailed embodiment of this invention has been described in terms of a filter that is a multiple of a Marr-Hildreth filter it should be apparent that any edge detecting filter could be used. Similarly, while the detailed embodiment of this invention has been described in terms of a range reducing filter that is a base ten logarithm of one plus the digitized image pixel value, it should be apparent that any dynamic range reducing filter can be used. Also, similarly, while the detailed embodiment of this invention has been described in terms of an adaptive threshold equal to the filtered image pixel value, it should be apparent that other functions of the filtered image pixel values could be used.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-usable storage device for execution by a computer processor. Method steps of the invention may be performed by a computer processor executing a program tangibly embodied on a computer-readable medium to perform functions of the invention by operating on input and generating output.

Common forms of computer-usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method for recovering information from an image in the presence of noise, the image being a digitized image comprising pixels, each of said pixels having a corresponding digitized image pixel value, said method comprising the steps of:
    applying a non linear dynamic range reducing filter to the digitized image pixel values;
    obtaining a range reduced image comprising range reduced image pixels, each of the range reduced image pixels having a corresponding range reduced image pixel value;
    applying an edge detecting filter to the range reduced image pixels;
    obtaining a filtered image, by applying the edge detecting filter, comprising filtered image pixels, each of the filtered image pixels having a corresponding filtered image pixel value; and
    adaptively binarizing the digitized image pixel value by utilizing an adaptive threshold obtained from said filtered image pixel value.

2. The method of claim 1 wherein the edge detecting filter comprises a Marr-Hildreth filter times a constant.

3. The method of claim 1 wherein the dynamic range reducing filter comprises a filter producing a range reduced image pixel value equal to a base ten logarithm, said logarithm having an argument equal to one plus the digitized image pixel value.

4. The method of claim 1 wherein the step of adaptively binarizing the digitized image value further comprises the step of comparing the digitized image value to the filtered image pixel value at each of said pixels.

5. A system for recovering information from an image in the presence of noise, the image being a digitized image comprising pixels, each of said pixels having a corresponding digitized image value, said system comprising:
    means for applying a non linear dynamic range reducing filter to the digitized image value of each said pixel and obtaining a range reduced image, said range reduced image comprising range reduced image pixels, each of the range reduced image pixels having a corresponding range reduced image pixel value;
    means for applying an edge detecting filter to the range reduced image, obtaining a filtered image, said filtered image comprising filtered image pixels, each of the filtered image pixels having a corresponding filtered image pixel value;
    means for adaptively binarizing the digitized image utilizing an adaptive threshold obtained from the filtered image pixel value.

6. The system of claim 5 wherein the edge detecting filter comprises a Hildreth-Marr filter times a constant.

7. The system of claim 5 wherein the dynamic range reducing filter comprises a filter producing a range reduced image pixel value equal to a base ten logarithm, said logarithm having an argument equal to one plus the digitized image pixel value.

8. The system of claim 5 wherein the means for adaptively binarizing the digitized image value further comprise means for comparing the digitized image value to the filtered image pixel value at each pixel.

9. A binarized image obtained from a digitized image, said binarized image containing information, the digitized image comprising pixels, each of said pixels having a corresponding digitized image value, said binarized image obtained by:
    obtaining a non linear range reduced image having range reduced image pixels, each of the range reduced image pixels having a corresponding range reduced image pixel value;
    applying an edge detecting filter to the range reduced image;
    obtaining, by applying said edge detecting filler, a filtered image comprising filtered image pixels, each of the filtered image pixels having a corresponding filtered image pixel value; and
    adaptively binarizing the digitized image value by utilizing an adaptive threshold obtained from said filtered image pixel value;
    whereby said information contained in said binarized image is easily recovered in the presence of noise.

10. The binarized image of claim 9 wherein said edge detecting filter comprises a Marr-Hildreth filter times a constant.

11. The binarized image of claim 9 wherein the dynamic range reducing filter comprises a filter producing a range reduced image pixel value equal to a base ten logarithm, said logarithm having an argument equal to one plus the digitized image pixel value.

12. The binarized image of claim 9 wherein the step of adaptively binarizing the digitized image value further comprises the step of comparing the digitized image value to the filtered image pixel value at each of said pixels.

* * * * *

UNITED STATES PATENT AND TRADEMARK OFFICE
CERTIFICATE OF CORRECTION

| | | |
|---|---|---|
| PATENT NO. | : 7,236,643 B2 | Page 1 of 1 |
| APPLICATION NO. | : 10/104878 | |
| DATED | : June 26, 2007 | |
| INVENTOR(S) | : L. Albertelli et al. | |

It is certified that error appears in the above-identified patent and that said Letters Patent is hereby corrected as shown below:

Column 6
In claim 9, at line 43, replace the word "filler" with --filter--.

Signed and Sealed this

Eighteenth Day of September, 2007

JON W. DUDAS
*Director of the United States Patent and Trademark Office*